Dec. 24, 1957 J. D. SHEPHERD 2,817,778

MOUNTING STRUCTURE FOR DISC-LIKE PIEZOELECTRIC CRYSTAL

Filed Aug. 10, 1953

INVENTOR.
Jack D. Shepherd
BY
ATTORNEY.

2,817,778
Patented Dec. 24, 1957

2,817,778

MOUNTING STRUCTURE FOR DISC-LIKE PIEZOELECTRIC CRYSTAL

Jack D. Shepherd, Overland Park, Kans., assignor to Wright Electronic Development Company, Kansas City, Mo., a partnership Application August 10, 1953, Serial No. 373,095

5 Claims. (Cl. 310—9.4)

This invention relates to the field of piezo-electricity and more particularly to improvements in crystal holders, the primary object being to provide a novel mounting means for the vibratory piezoelectric device itself, capable of permitting optimum performance of the crystal, especially for thickness shear vibration to the virtual exclusion of longitudinal, torsional and all other conflicting shears.

It is the most important object of the present invention to provide an improved mounting structure especially adapted to hold a relatively heavy piezoelectric device in place and taking the form of a convexo-convex disc, all for proper vibratory action with a particular shear and at a frequency to which the crystal is inherently resonant.

Another important object of this invention is to provide a piezoelectric unit having a crystal of increased piezoelectric efficiency because of the improved mounting structure therefor which is of itself physically rugged and inherently capable of properly supporting the crystal for maximum performance under all conditions of adverse use including shock which would otherwise tend to damage the unit and necessitate readjustment, repair or replacement.

Another feature of the present invention relates to the provision of mounting structure capable of attaining the aforesaid objects, and additionally advantageous because of the ease and accuracy of the adjustment to meet preselected specifications.

A further aim of this invention is to provide crystal mounting structure engageable with the opposed marginal edges of the crystal adjacent the periphery thereof in a firm and balanced manner so as to prevent misalignment of the crystal and accidental misadjustment even under conditions of rough handling, all while permitting proper thickness shear vibration of the crystal to perform its intended function and in an adequate and high efficient manner.

A still further object of this invention is to provide mounting means of the aforementioned character capable of performing all of the highly important functions hereinabove mentioned, yet operable to establish proper electrical contact with the crystal, or more particularly with the electrodes thereon, and an electric circuit with which the unit is adapted to be connected.

Another and highly important object of this invention is to provide mounting structure for crystal holders that includes as a part of the adjustable means for holding the crystal in place and in proper coupling relationship with an electric circuit, yieldable means in the nature of a circular leaf spring so interposed as to compensate for contraction and vibration due to temperature changes.

An extremely important aim of the instant invention is to provide a mount capable of, yet not limited to satisfactory support of relatively thick, low-frequency crystals, thereby improving upon mounts heretofore developed which are at best only efficient when used with relatively thin, high-frequency crystals, all to the end that a large variety of crystals may now, for the first time, be practically employed in the field of electricity.

Figure 1:
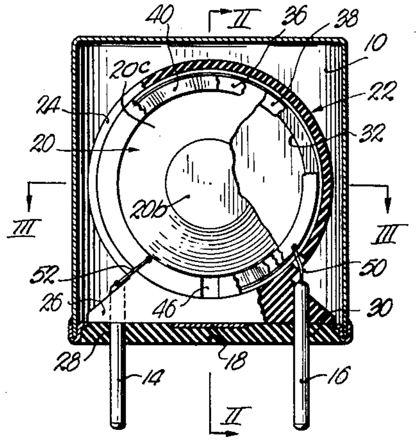
Figure 1 is a cross-sectional view taken on irregular line I—I of Fig. 2 looking in the direction of the arrows showing a crystal mount for crystal holders made pursuant to my present invention, parts being broken away and in section to reveal details of construction.

The field to which the present invention relates is crowded with suggestions for adequate and efficient mounting of piezoelectric devices, and while many are quite satisfactory for the purposes intended, no means have heretofore been disclosed for properly supporting a relatively heavy, disc-like convexo-convex crystal for thickness shear vibration to the exclusion of all conflicting shears.

Additionally, the prior art is devoid of mounting structure of such nature that includes, as a component part thereof, means to compensate for expansion and contraction due to temperature changes. A unit of this nature capable of attaining all of the objects initially set forth herein is illustrated in the drawing.

Figure 2:
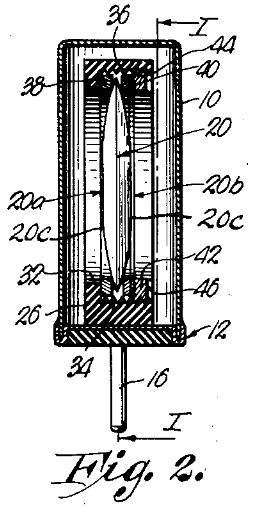
Fig. 2 is a cross-sectional view taken on line II—II of Fig. 1.
Figure 3:
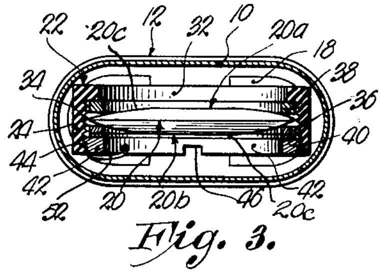
Fig. 3 is a cross-sectional view taken on line III—III of Fig. 1.
Figure 4:
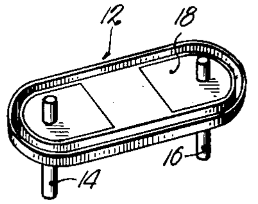
Fig. 4 is a perspective view of the support forming a part of the crystal holder entirely removed from the remaining parts of the unit and illustrating the double prong construction thereof.

The crystal holder shown in its entirety by Figs. 1 to 3 inclusive, includes a cover or closure cap designated by the numeral 10 having an open end that is closed by a support broadly designated by the numeral 12 and shown also more specifically in Fig. 4 of the drawing.

Support 12 mounts a pair of prongs 14 and 16 through the medium of insulating material 18 through which the prongs 14 and 16 extend.

The novel mounting structure of the present invention for holding a piezoelectric device 20 in place, is secured to the support 12 and mounted in its entirety within the closure cap 10. It includes a body broadly designated by the numeral 22, made entirely of insulating material and including a circular band 24, together with a base 26 that rests directly upon the support 12 as shown in Figs. 1 and 2. Spaced openings 28 and 30 in the base 26, clear the prongs 14 and 16 respectively as shown in Fig. 1. Band member 24 is provided with a stop in the nature of an inturned, annular shoulder 32 integral therewith and adjacent one circular edge of the band 24. The remainder of the innermost face of the band 24 is provided with screw threads 34.

The piezoelectric crystal 20 is interposed within the band 24 between a pair of spaced, annular rings 36 and 38 that are of conductive material or provided with a coating to render the same conductive, both rings 36 and 38 having an outside diameter sufficiently small to permit ready insertion thereof into the band 24 where the ring 38 engages the shoulder or flange 32.

Yieldable means in the nature of a circular leaf spring 40 that is wavy or transversely corrugated throughout its length is interposed in the band 24 between the conductor ring 36 and a ring nut 42 provided with external screw threads 44 adapted to mesh with the screw threads 34. The spring 40 and the nut 42 are likewise either made of conductive material or rendered conductive as aforementioned, and tool-receiving notches 46 in the nut 42 facilitate manipulation thereof within the band 24.

Band 24 has a hole 48 for clearing a conductor wire 50 that connects prongs 16 with conductor ring 38 and a second conductor wire 52 interconnects prong 14 and ring nut 42.

The piezoelectric device 20 or quartz crystal chosen for illustration constitutes the so-called "AT-cut" type of vibratory unit and is intended for thickness shear vibration. It is of a convexo-convex disc-like configuration presenting a circular periphery and the double convex shape thereof presents a pair of opposed, centrally located, flat, circular areas or surfaces *20a* and *20b*. The crystal 20 herein illustrated has a resonant frequency of one megacycle, but it is to be pointed out that the mounting structure hereof permits for highly efficient thickness shear vibration in crystals of this type throughout at least a range of from 500 to 1500 kilocycles. In this respect however, the shape and configuration of the crystal and its frequency of operation have no bearing whatsoever upon the invention.

Figure 5:
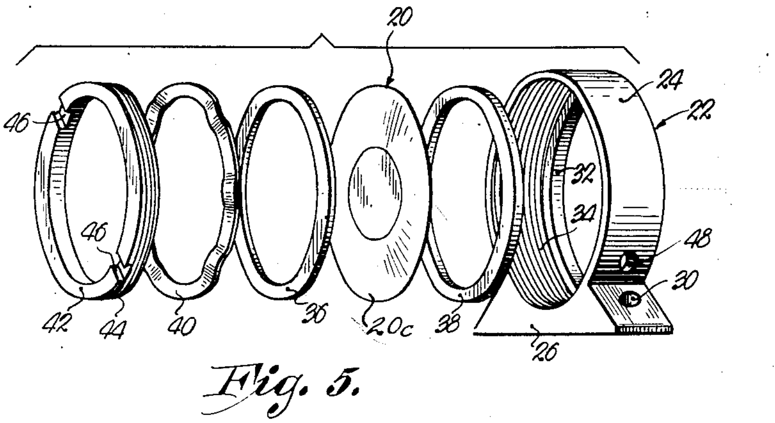
Fig. 5 is an exploded perspective view of a piezoelectric device and the component parts of the mount therefor shown in Figs. 1 to 3 inclusive.

Fig. 5 of the drawing illustrates the ease of assembling the component parts of the unit hereof, it being noted that each of the parts 38, 20, 36, 40 and 42 may be placed within the band 24 in such succession, whereupon the nut 42 may be manipulated within the band 24 to obtain proper adjustment of the entire unit prior to mounting the cap 10 in closing relationship thereto.

The manner in which the rings 36 and 38 engage the crystal 20 and hold the same in place, is to be particularly noted in Figs. 2 and 3 of the drawing. A line contact is presented between the rings 36 and 38 along their innermost edges with the proximal face of the crystal 20 at its margin and adjacent the circumference thereof. It is noted that the band 24 circumferentially surrounds all of the parts shown in Fig. 5 of the drawing, and that the shoulder 32 prevents all outward movement of the ring 38 and the crystal 20 in one direction with respect to the body 22, resisting therefore, pressure of the ring nut 42 through the compensating spring 40.

Proper electrical coupling of the ring 38 and the nut 42, with the crystal 20, may be accomplished through the provision of any suitable nodal means, but the crystal 20 herein illustrated is provided with silver plating *20c* on both faces thereof, or any other type of coating made from gold, copper or other conductive material. Consequently, when the nut 42 is drawn up, a firm electrical connection is established between the rings 36 and 38 throughout the circumferences thereof with the corresponding nodal coatings *20c*. Obviously, such coatings *20c* are not interconnected but since the same each cover substantially the entire opposed faces of the crystal 20, there is presented full surface electrodes to provide proper electrical coupling when the unit is interposed within an electric circuit through the medium of prongs 14 and 16.

The provision of spring 40 compensates for contraction and expansion due to temperature changes and it is obvious that if it is desired to omit this important feature, it would not be essential to provide for the ring 36 since the nut 42 could then bear directly against the proximal electrode of the crystal 20 in the same manner as ring 36 is held in engagement therewith as shown in Figs. 2 and 3. Furthermore, if the compensating member 40 and the ring 36 is used as herein illustrated, it is conceivable that prong 14 might be coupled directly with the ring 36 by means of wire 52 rather than with the nut 42 and an additional hole such as shown at 48, might be provided in the band 24 to accommodate the wire 52.

The advantages of using crystals of the type herein contemplated are well understood in the industry. There is now presented a novel mount that makes it possible to achieve full use of such crystals over wide frequency bands to attain excellent performance even though many variances may be made in the contours of the opposed faces thereof.

For the first time, so far as I am aware, there is presented a mount that may be adjusted at will so that the desired pressure may be applied to the crystal by the two rings engaging the opposed electrodes thereof. The pressure may be such as to closely approach complete bonding, and therefore, minimum shear vibration, or reduced so as to effect the precise extent of vibration and manner of performance desired.

In any event, the pressure applied may be of such nature as to permit maximum vibration if desired, yet at all times be sufficient to avoid any movement of the crystal bodily with respect to the mount. Elimination of such relative shifting of the crystal and the mount prevents frequency change and avoids wearing away of the electrodes at the points of contact with proximal parts of the mount.

Additionally, it cannot be overemphasized that the electrodes are fully and firmly contacted by the opposed conductor rings at all times, presenting proper electrical connection in complete absence of any bridging or gapping whatsoever.

These features and many others are all extremely important in high precision, rather small, delicate electrical instruments of this type and apply to the novel mount hereof regardless of the crystal to be carried thereby. Either or both faces of the crystal may be provided with one or a multiple of concentric contours and such contouring may be extended to the peripheral edge of the crystal if desired without adverse interference by the mount with vibration and optimum performance as selected by adjustment. Thus, whether the surfaces are convex, concave, flat or shaped in any other manner, has no bearing upon the utility of the mount hereof as an excellent support for the crystal.

Still further, the circular configuration of the periphery of the crystal need not be followed; the conducting rings that engage the electrodes may be shaped as desired; and the circular form thereof chosen for illustration may be varied, all without departing from the spirit of the invention as defined by the scope of the appended claims.

Having thus described the invention what is claimed as new and desired to be secured by Letters Patent is:

1. In piezoelectric apparatus, an electrically insulative body having a threaded bore of circular cross section therethrough; a pair of annular, electrically conductive rings within the bore, said rings being of sufficiently lesser outer diameter than the diameter of the bore to permit movement of the rings along the bore; a circular, disc-like, thickness shear vibrating, piezoelectric crystal of lesser diameter than the outer diameter of the rings and of greater diameter than the inner diameter of the rings, said crystal being within the bore between the rings, said crystal having a pair of opposed faces; an electrically conductive electrode coating on each face respectively of the crystal; and means including a ring nut threadedly secured within the bore in engagement with both the body and the rings for holding the latter in supported engagement with the crystal and in electrical contacting relationship with the coatings.

2. In the apparatus as set forth in claim 1, wherein said means includes a rigid member integral with the body and extending into the bore adjacent one extremity thereof, the rings and the crystal being between the member and the ring nut.

3. In the apparatus as set forth in claim 2, wherein is provided an annular, leaf spring within the bore in engagement with one of the rings opposite the crystal.

4. In the apparatus as set forth in claim 1, wherein said means further includes an inturned flange in the bore against which one of the rings abuts, an annular, leaf spring in engagement with the other of the rings opposite the crystal, the ring nut being in engagement with the leaf spring opposite said other ring.

5. In the apparatus as set forth in claim 4, wherein said faces of the crystal are marginally beveled, and said rings are of rectangular cross section, whereby the crystal is supported by the rings through substantially line contact with the latter adjacent the circumferential edge of the crystal.

References Cited in the file of this patent

UNITED STATES PATENTS

| | | |
|---|---|---|
| 2,394,999 | Keller | Feb. 19, 1946 |
| 2,418,491 | Wachtman | Apr. 8, 1947 |
| 2,457,338 | Bates et al. | Dec. 28, 1948 |
| 2,595,037 | Wolfskill | Apr. 29, 1952 |

FOREIGN PATENTS

| | | |
|---|---|---|
| 560,644 | Great Britain | Apr. 13, 1944 |
| 906,999 | France | June 4, 1945 |